United States Patent [19]

Kurokawa

[11] Patent Number: 4,907,255

[45] Date of Patent: Mar. 6, 1990

[54] CLOCK ADJUSTING SYSTEM OF A FACSIMILE MACHINE

[75] Inventor: Shunji Kurokawa, Zama, Japan

[73] Assignee: Ricoh Company, Ltd., Tokyo, Japan

[21] Appl. No.: 289,239

[22] Filed: Dec. 23, 1988

[30] Foreign Application Priority Data

Dec. 25, 1987 [JP] Japan ................................ 62-327325

[51] Int. Cl.[4] ........................ H04M 11/00; H04M 1/00

[52] U.S. Cl. .................................... 379/100; 379/102; 379/106; 358/409; 358/436

[58] Field of Search ................. 379/100, 107, 106, 92, 379/102; 358/257, 84, 406, 409, 436, 439

*Primary Examiner*—Jin F. Ng

*Assistant Examiner*—Wing F. Chan

*Attorney, Agent, or Firm*—Oblon, Spivak, McClelland, Maier & Neustadt

[57] ABSTRACT

A time adjusting system includes a facsimile machine having a real time clock and a center station in charge of management of accurate time information. The facsimile machine places a call to the center station at a predetermined time and receives accurate time information therefrom to thereby adjust the time of its own real time clock.

1 Claim, 4 Drawing Sheets

CLOCK ADJUSTING SYSTEM OF A FACSIMILE MACHINE

BACKGROUND OF THE INVENTION

1. Field of the Invention

This invention relates to a system for adjusting or setting the time of a real time clock provided in an apparatus and, more in particular, to a system for adjusting or setting the time of a clock provided in a facsimile machine.

2. Description of the Prior Art

A facsimile machine is typically provided with a real time clock for indicating the time and date. Such a real time clock of a facsimile machine typically uses a quartz oscillator and its accuracy is typically on the order of ±30 seconds per month. Thus, if such a clock has been used over a year without adjustments, there will be produced an error on the order of 6 minutes. Under the circumstances, the operator is required to operate the facsimile machine to adjust the time of the real time clock provided therein from time to time. Such a time adjusting operation is cumbersome, requiring a relatively complicated manipulation of buttons or keys.

Japanese Patent Laid-open Pub. No. 60-239819 proposes an apparatus for correcting the time of an information processing apparatus, such as a facsimile machine. However, this prior art proposal is not sufficiently satisfactory and there has been needs to develop a new system for adjusting the time of a real time clock provided in an apparatus, such as a facsimile machine.

SUMMARY OF THE INVENTION

In accordance with the present invention, there is provided a facsimile machine provided with a real time clock indicating the time and date. A transmitting apparatus, which manages accurate time information, transmits through a telephone network its time information, and the facsimile machine receives this time information and adjusts the time of its real time clock based thereon.

It is therefore a primary object of the present invention to obviate the disadvantages of the prior art as described above and to provide an improved system for adjusting or setting the time of a real time clock provided in an information processing apparatus.

Another object of the present invention is to provide an improved system for adjusting the time of a real time clock provided in a facsimile machine.

A further object of the present invention is to provide an improved facsimile machine provided with a real time clock which may be adjusted or corrected automatically upon receipt of accurate time information supplied from a time managing apparatus.

A still further object of the present invention is to provide an improved time adjusting system of a facsimile machine which does not require a manual time adjusting operation by an operator.

Other objects, advantages and novel features of the present invention will become apparent from the following detailed description of the invention when considered in conjunction with the accompanying drawings.

DESCRIPTION OF THE PREFERRED EMBODIMENTS

Figure 1:
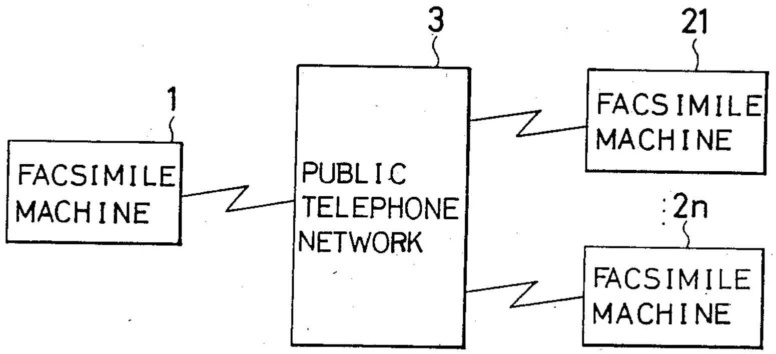
FIG. 1 is a block diagram showing a facsimile communication system constructed in accordance with one embodiment of the present invention.

Referring now to FIG. 1, there is shown a facsimile communication system constructed in accordance with one embodiment of the present invention. As shown, the facsimile communication system includes a center facsimile machine 1, which is established as a center station and in charge of management of basic time information, and a plurality of local facsimile machines *2l* through *2n*, which are local stations placed at any desired place and are operatively coupled to the center facsimile machine 1 through a telephone network 3, such as a public telephone network.

Figure 2:
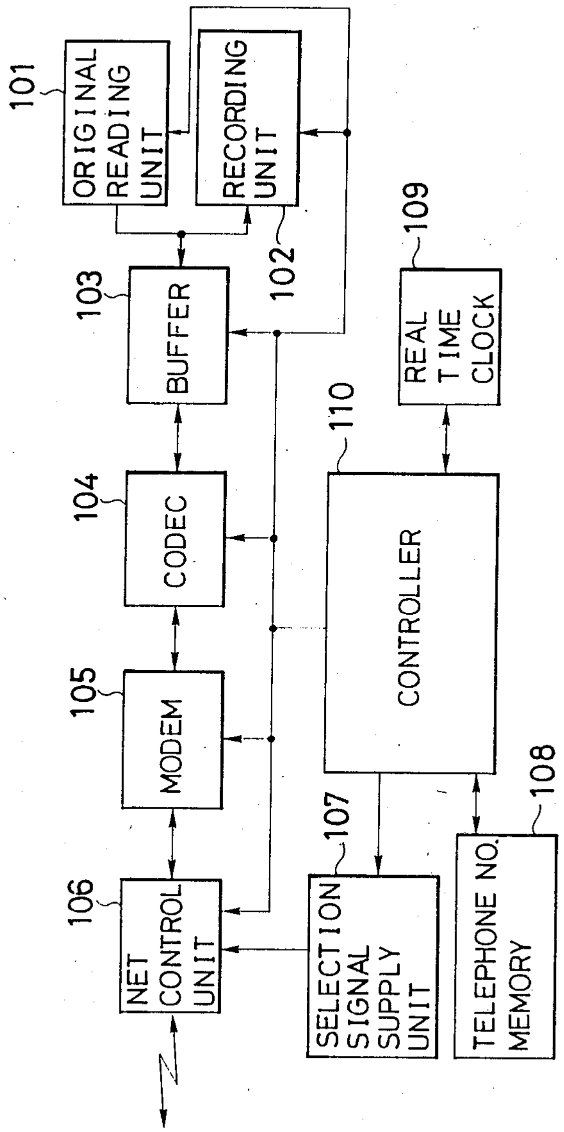
FIG. 2 is a block diagram showing the overall structure of a facsimile machine constructed in accordance with one embodiment of the present invention.

FIG. 2 illustrates in block form the overall structure of each of the facsimile machines 1 and *2l* through *2n* shown in FIG. 1. As shown, each of the facsimile machines 1 and *2l* through *2n* includes an original reading unit 101 for optically reading an original image to be transmitted to thereby produce an electrical image information and a recording unit 102 for recording image information on a sheet of recording paper. The facsimile machine also includes a buffer 103 for temporarily storing such image information and a codec 104 for coding image information to be transmitted and decoding the received image information before having it recorded by the recording unit 102. Also provided in the facsimile machine includes a MODEM 105 which modulates or demodulates image information before transmission of or after reception of image information and also transmits and receives various procedural signals in a communication control procedure.

A net control unit 106 is also provided and it is connected to a telephone network so that the net control unit 106 serves to establish a connection to or disconnection from the associated telephone network and also to carry out a predetermined call placing or receiving operation by sending a selection signal and detecting the reception of a call. A selection signal supply unit 107 is also provided and it serves to supply a selection signal, which is a telephone number of a desired destination station, in the form of a dial pulse or PB signal at the time of the above stated call placing operation. A telephone number memory 108 is also provided and it stores telephone numbers of one or more desired destination stations which are to be used in an automatic dialing operation.

A real time clock 109 is also provided for indicating the date and time of the day. It is to be noted that, in the above-described present facsimile communication system, the center facsimile machine 1 has an extremely accurate real time clock 109 with very little errors and each of the local facsimile machines *2l* through *2n* includes a real time clock 109 of ordinary accuracy. There is also provided a system controller 110 which is typically comprised of a micro-computer system for controlling each of the above-stated components of the present facsimile machine. It is to be noted that the system controller 110 has a control function for executing an automatic call placing operation at a previously set desired time.

With the above-described structure, when the communication system of the present embodiment is to be operated, the telephone number of the center facsimile machine 1 is stored in the telephone number memory 108 of each of the local facsimile machines 2*l* through 2*n* and different transmission start times are set in the system controller 110. Such transmission start times may be particular times of a day or combinations of particular days of a week and particular times.

Figure 3:
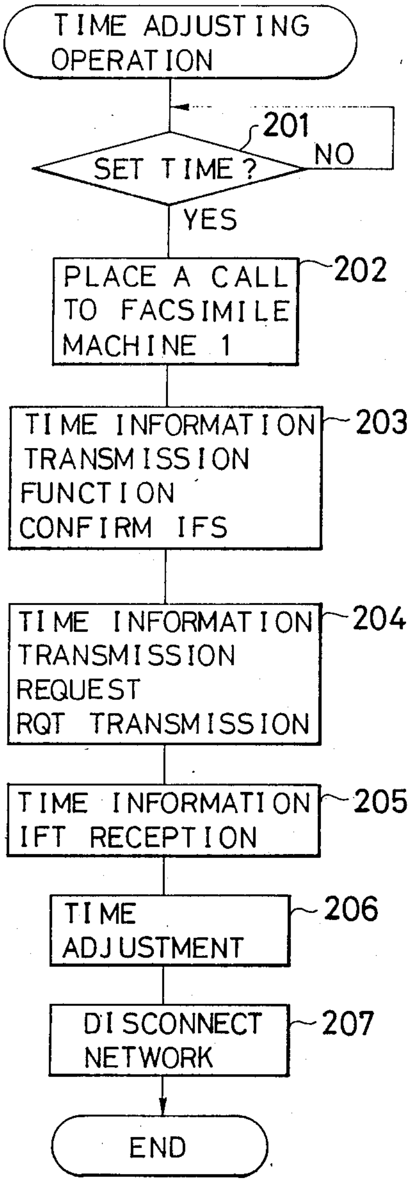
FIG. 3 is a flow chart showing a sequence of steps of a real time clock adjusting operation in accordance with one embodiment of the present invention.

When set as described above, the facsimile machines 2*l* through 2*n* initiate their operations. Now, let us suppose that one local facsimile machine 2*i* has just initiated its operation. Then, as shown in FIG. 3, it constantly monitors the time and waits until the set time has arrived (from N of step 201 to step 201). When the set time has arrived (Y of step 201), a call is placed to the telephone number stored in the telephone number memory 108, i.e., center facsimile machine 1 (step 202). Thus, such a call placement operation is carried out at a predetermined time period in accordance with the call placing times which have been set arbitrarily in advance.

Figure 4:
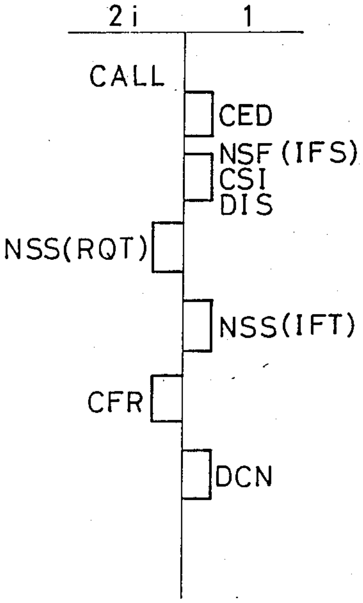
FIG. 4 is an illustration showing a communication control procedure of a facsimile machine.

Upon receipt of a call, the center facsimile machine 1 carries out a predetermined communication control procedure according to G3 regulations with the calling local facsimile machine 2*i*. That is, as shown in FIG. 4, the center facsimile machine 1 transmits such signals as CED, NSF, CSI and DIS signals. The center facsimile machine 1 is so structured to have a function of transmitting the time information indicated by the real time clock 109 to other facsimile machines. The NSF signal contains a data indicating the presence of such a time information transmitting function IFS. Thus, upon receipt of such an NSF signal, the facsimile machine 2*i* recognizes the fact that the center facsimile machine 1 has a time information transmitting function IFS (step 203). Then, the local facsimile machine 2*i* sets a time information transmission request RQT in an NSS signal and transmits this NSS signal to the center facsimile machine 1 (step 204).

Then, the facsimile machine 1 receives the NSS signal and detects the time information transmission request RQT therein and thus transmits an NSS signal, in which time information IFT indicated by the real time clock 109 is set, to the local facsimile machine 2*i*. Upon receipt of this NSS signal, the local facsimile machine 2*i* extracts the time information IFT from the NSS signal thus received (step 206). And, after transmission of a CFR signal, the local facsimile machine 2*i* adjusts or sets its real time clock 109 to the time indicated by the time information IFT (step 206). Then, the center facsimile machine 1 transmits a DCN signal to have it disconnected from the network. Similarly, upon receipt of this DCN signal, the local facsimile machine 2*i* is also disconnected from the network (step 207).

It has been described as to the operation of the particular local facsimile machine 2*i*. It is to be understood that the remaining local facsimile machines 21 through 2*n* also operation in a similar manner.

In the above-described embodiment, the center facsimile machine 1 is provided with a high-precision real time clock 109 and each of the local facsimile machines 2*l* through 2*n* is provided with a real time 109 of ordinary precision. And, each of the local facsimile machines 2*l* through 2*n* carries out an automatic call placing operation to the center facsimile machine 1 at a previously set time to receive time information IFT from the center facsimile machine 1, thereby adjusting the time of its own real time clock 109 based on the time information IFT thus received. With this, the time of the real time clock 109 of each of the local facsimile machines 2*l* through 2*n* can be adjusted to accurate time at a predetermined period and thus the time of the real time clock 109 of each of the local facsimile machines 2*l* through 2*n* can be automatically maintained at accurate time at all times. As a result, the real time clock 109 of each of the local facsimile machines 2*l* through 2*n* does not require to be adjusted manually by an operator.

In order to provide a facsimile machine having a real time clock of high accuracy, it is required to finely adjust or trim the resistors or the like of the real time clock circuit during manufacture of such a facsimile machine. However, in accordance with the present invention, since the time of the real time clock 109 is automatically adjusted or corrected at a predetermined time period, the real time clock 109 to be provided in the local facsimile machine 21 through 2*n* does not need to be of the high accuracy type, and the above-described fine adjustments are not required.

In the above-described embodiment, it is so structured that each of the local facsimile machines 2*l* through 2*n* places a call to the center facsimile machine 1 to thereby receive time information IFT from the center facsimile machine 1. Alternatively, it may also be so structured that the center facsimile machine 1 places a call to each of the local facsimile machines 2*l* through 2*n* to thereby transmit time information IFT using an NSS signal in a similar manner. Of course, the transmission of time information IFT can be carried out using any other desired procedural signal other than an NSS signal as described above. Besides, in the above-described embodiment, it is so structured that the center facsimile machine 1 is in charge of management of accurate time information IFT. However, use may be made of any other communication or information processing apparatus for managing such accurate time information IFT in place of the center facsimile machine 1. An exclusive apparatus for managing such accurate time information IFT may also be used, if desired. In accordance with the present invention, even if errors in time occur differently among the local facsimile machines 2*l* through 2*n*, they can be accurately corrected and all of the local facsimile machines 2*l* through 2*n* can be maintained at accurate time at all times because they are constantly and periodically adjusted in time with reference to the common accurate time information supplied from the common center station 1.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A time adjusting system of a facsimile machine, comprising:

a first facsimile machine having a real time clock indicating time;

a second facsimile machine having a time information transmitting function which may be operatively connected to said first facsimile machine through a telephone network and which is in charge of management of accurate time information; and whereby said first facsimile machine places a call to said second facsimile machine at a predetermined time to thereby establish a communication path between said first facsimile machine and said second facsimile machine so that said second facsimile machine transmits said time information to said first facsimile machine and said first facsimile machine adjusts the time of said real time clock based on said time information thus received.

* * * * *